Figure 3:
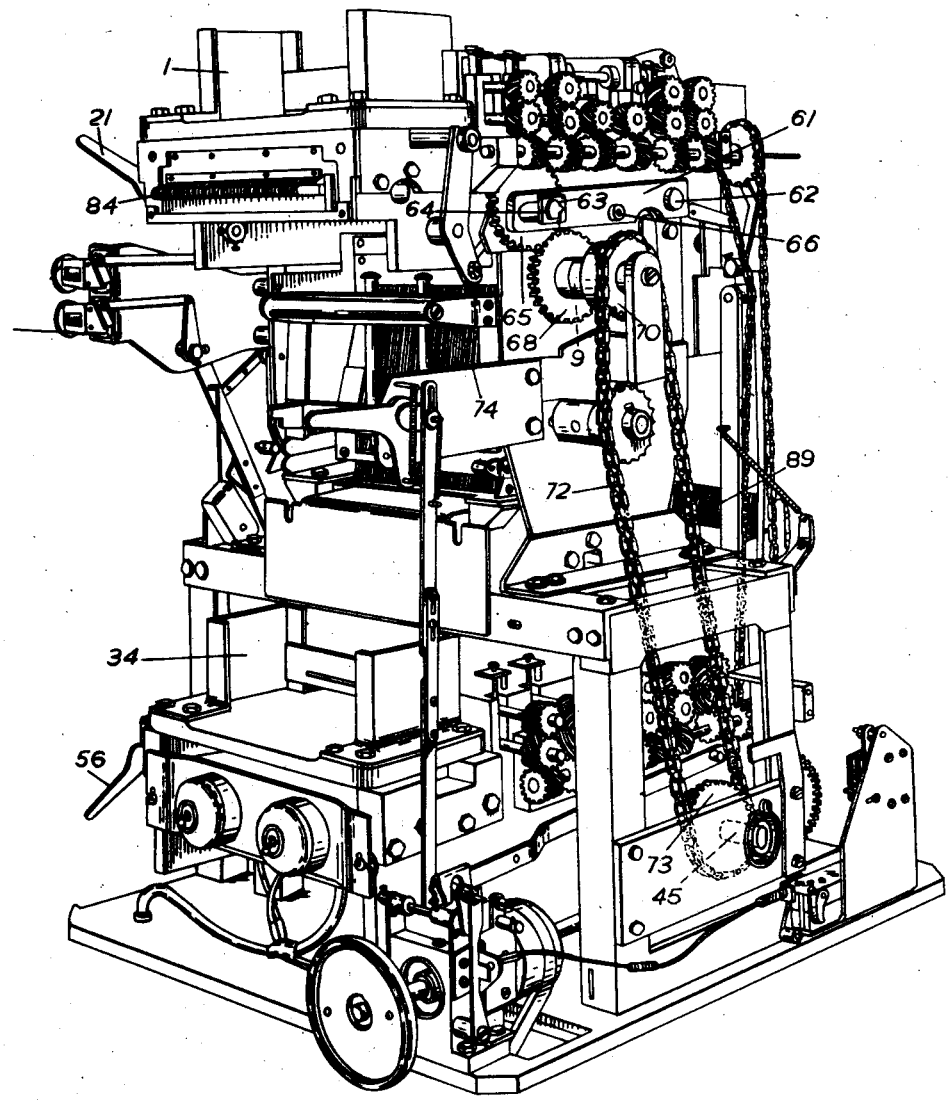

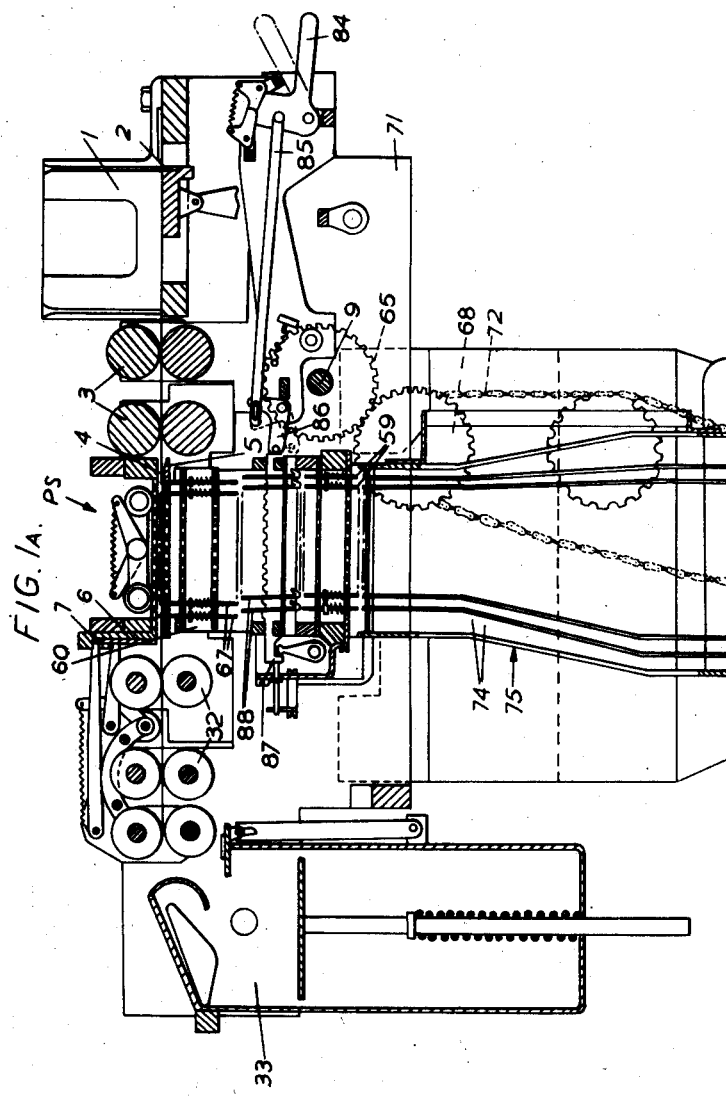

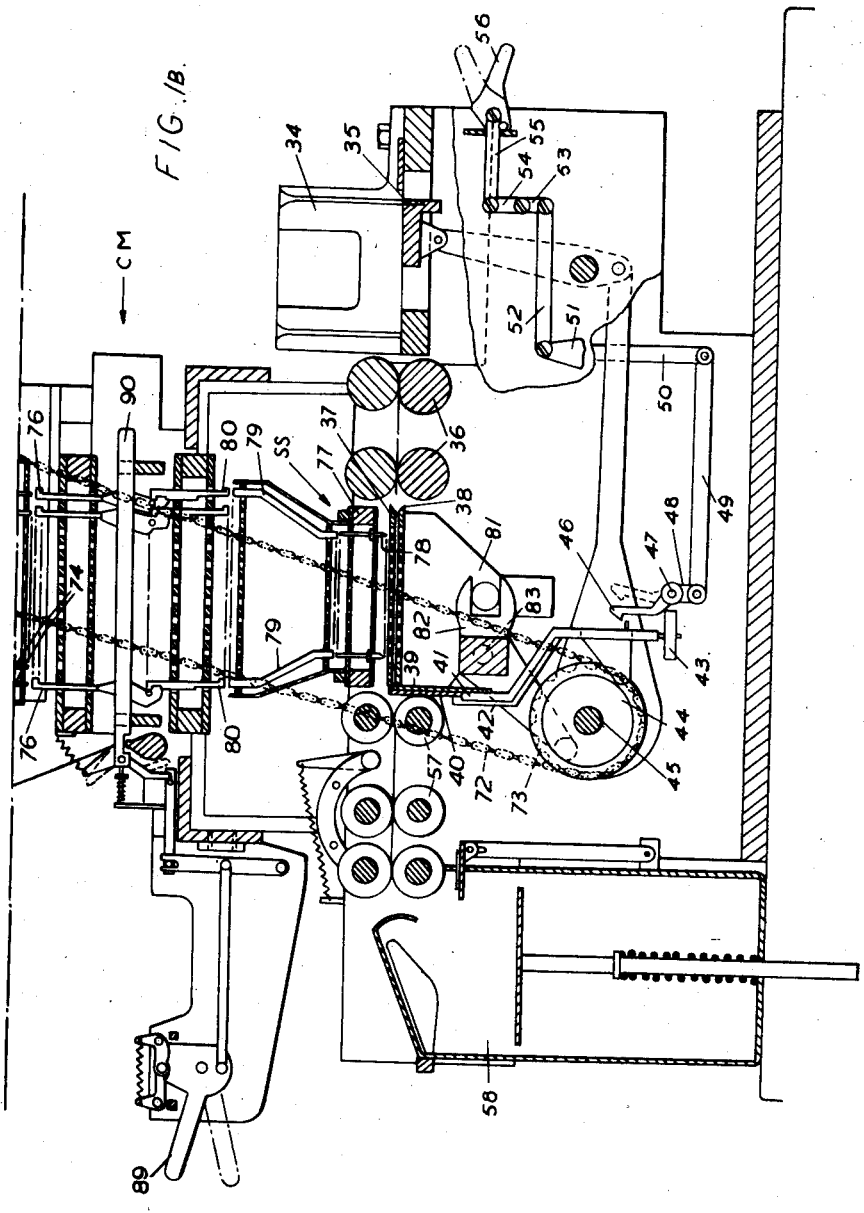

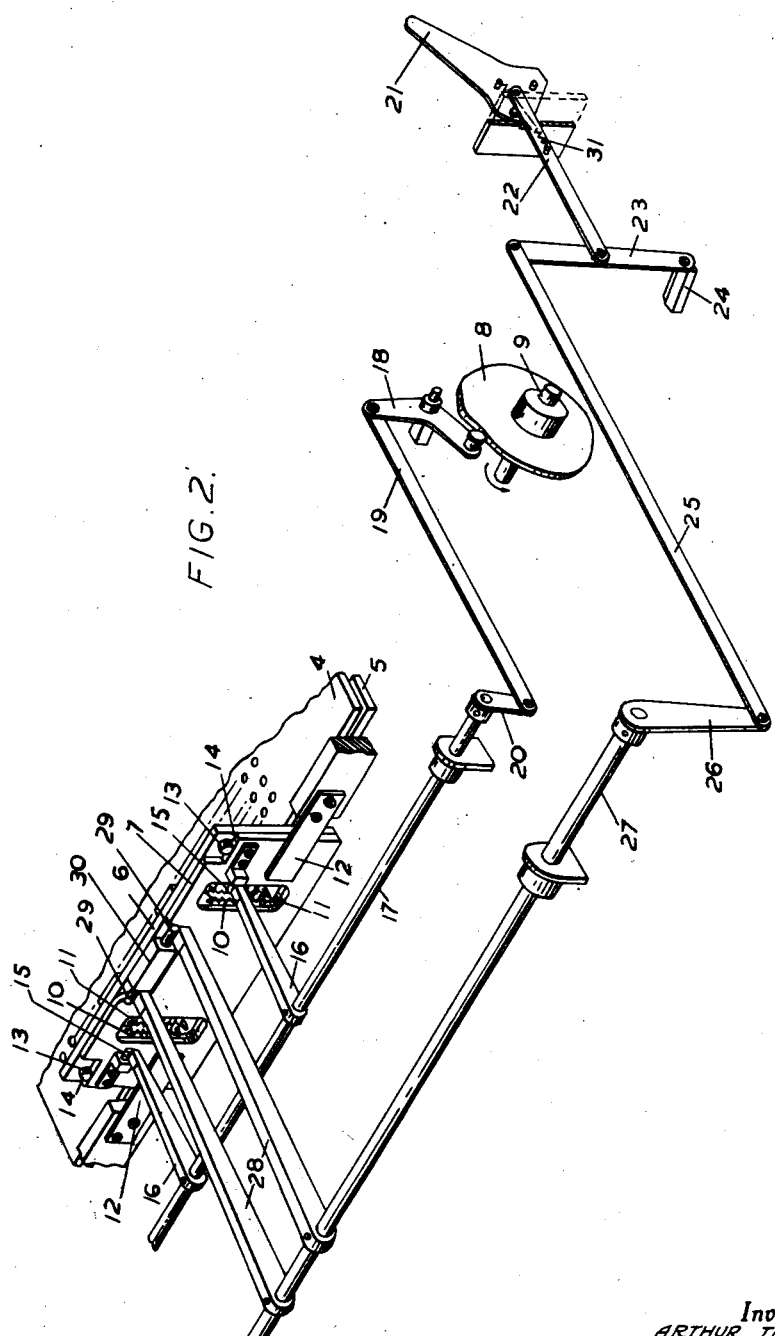

Inventors
ARTHUR THOMAS
FREDERICK S. RHODES
By John L. Sterling
Attorney

June 23, 1953  A. THOMAS ET AL  2,643,056
APPARATUS FOR COMPARING STATISTICAL RECORD CARDS
Filed Jan. 16, 1951  5 Sheets-Sheet 5

Inventors
ARTHUR THOMAS
FREDERICK S. RHODES
By J. L. Sterling
Attorney

UNITED STATES PATENT OFFICE 2,643,056

APPARATUS FOR COMPARING STATISTICAL RECORD CARDS

Arthur Thomas, Wallington, and Frederick Sidney Rhodes, Thornton Heath, England, assignors to Powers-Samas Accounting Machines Limited, London, England, a British company Application January 16, 1951, Serial No. 206,178
In Great Britain February 2, 1950

8 Claims. (Cl. 235—61.7)

This invention relates to apparatus for comparing statistical record cards whereby information recorded on one card can be compared with information recorded on another card.

It is sometimes desired to compare the whole of the information contained in a record card with that contained in another card but often it is desired only to compare the information contained in a certain field of one card with the information contained in a predetermined field of another card. One example of the comparison of card fields is when, for the purpose of computing taxation, one card of a pair, which may be referred to as a primary card, contains a record made by way of perforations or otherwise in particular zones of the card, such information relating for example to a particular employee, the information being required by a central authority, for example the Government, to be supplied by the employer. The other card of each pair, which may be termed a secondary card, shows by perforations or otherwise the wages and hours of work and is used by the employer in order to compute this information. At intervals the employer returns the secondary cards and the authority desires to compare them with the primary cards. As regards the information common to the primary and secondary cards, the cards of a pair will be identical for any given employee. When the cards have been collected they are put through a sorting machine and mechanically brought into sequence, the primary cards then being in the same order as the secondary cards.

The apparatus according to the invention is intended to be used for comparing primary and secondary cards to ascertain whether, in a selected field or fields the information contained in a pair of cards is identical, but in some instances it can be conditioned to verify the correctness of entries recorded on one of the cards.

In United States Patent No. 1,897,085 there has been described a machine for comparing perforated record cards, this machine comprising an upper and a lower sensing pin box of which the pins engage with upper and lower testing pins respectively on simultaneous operation of the upper and lower sensing pin boxes, means tending to move one set of testing pins relatively to the other set, and means preventing such relative movement when the cards passing through the upper and lower sensing pin boxes do not agree.

It is an object of the present invention to provide an improved form of comparing apparatus, the apparatus being so constructed that it can be conditioned to compare a selected field or fields of one card with a selected but different field or fields of the other card of a pair.

As is known in the art, record cards are provided with data index positions located in horizontal rows and vertical columns and, in some instances, additional accommodation for information is provided by data index positions disposed between the normal horizontal rows of data index positions on the card. In such cards the data index positions of normal rows are referred to as normal positions and the data index positions located between the normal rows are referred to as interstage positions.

It is an object of the present invention so to construct a comparing machine that it can be conditioned to sense either normal or interstage data positions and it is a further object so to condition a machine that a data pattern consisting of data sensed from normal index positions can be compared with a data pattern sensed from interstage index positions on a second card.

It is a further object of the invention so to construct a comparing machine that it may be conditioned to determine the presence or absence of selected data indicating perforations in one card of a pair being compared.

According to the invention there is provided for comparing statistical record cards, a machine comprising a first and a second sensing device, said sensing devices being operable in timed relation so that one effects sensing in advance of the other, comparing mechanism to compare a data pattern sensed by the first sensing device with a data pattern sensed by the second sensing device, and to give an indication of agreement or disagreement between the data patterns compared, and transmission means for each sensing device to transmit a data pattern sensed thereby to the comparing mechanism, said transmission means being simultaneously actuated by the sensing devices to transmit to the comparing mechanism data patterns sensed by the sensing devices.

A machine constructed in accordance with the invention can be so conditioned as to perform the following functions:

(a) The same field in a primary and a secondary card can be sensed in the normal data positions.

(b) A normal field in a primary card can be compared with the same field in the interstage position on a secondary card.

(c) An interstage field on a primary card can be compared with the same field in the normal position on a secondary card.

(d) An interstage field on a primary card can be compared with the same interstage field on a secondary card.

(e) A predetermined normal field on a primary card can be compared with a predetermined but different normal field on a secondary card.

(f) A predetermined normal field on a primary card can be compared with a predetermined but different interstage field on a secondary card.

(g) A predetermined interstage field on a primary card can be compared with a predetermined normal but different field on a secondary card.

(h) A predetermined interstage field on a primary card can be compared with a predetermined but different interstage field on a secondary card.

(i) A predetermined field on a primary card can be compared with a plurality of predetermined fields on a secondary card.

(j) A predetermined field in a secondary card can be compared with a blanked out portion of the sensing device for the primary card to check that the predetermined field in the secondary card contains no data perforations although in the corresponding field in the primary card there are data perforations.

(k) Selected data perforation positions in one record card can be compared with a permanent setting in the comparing mechanism to determine the presence or absence of perforations, e. g. control holes, in said selected positions of the card.

Figure 4:
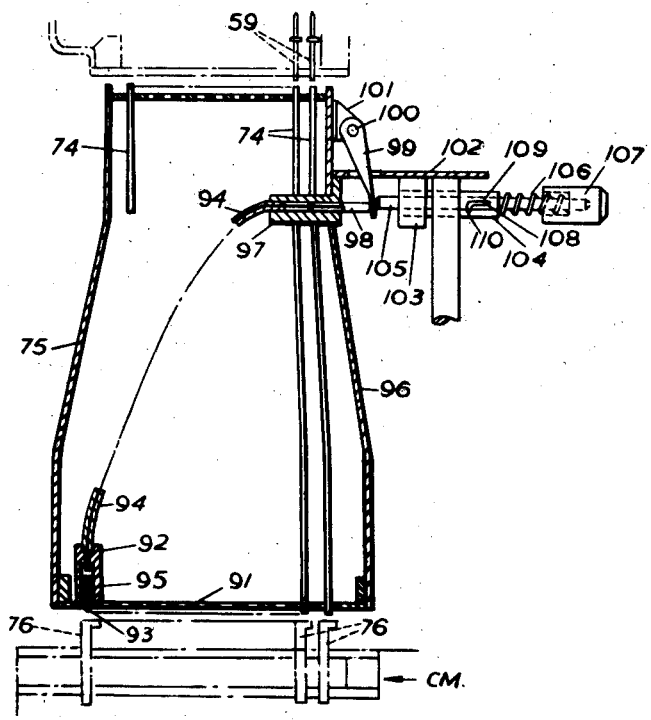

In order that the invention may be more clearly understood, an embodiment thereof will now be described by way of example with reference to the accompanying diagrammatic drawings in which:

Figures 1A and 1B together are an elevation, in section, of a comparing machine constructed according to the invention, Figure 2 is a perspective view showing the method of operation of card stops associated with the primary sensing device, Figure 3 is a perspective view diagrammatically illustrating some of the driving mechanism for the machine shown in Figure 1, Figure 4 is a section through a connection box and illustrates the manner in which a permanent setting can be applied to selected positions in the comparing mechanism.

Referring to the drawings, the machine comprises a primary sensing device indicated generically by the reference letters PS, Figure 1A, and a secondary sensing device indicated generically by the reference letters SS, Figure 1B. Located between the primary and secondary sensing devices is a comparing mechanism CM, the construction of which is as described in co-pending application S. No. 205,702, filed January 12, 1951, now Patent No. 2,614,750.

The primary cards are contained in a magazine 1 from the bottom of which they are fed one at a time by a picker 2 to rollers 3 which feed the primary card into a card chamber consisting, in known manner, of an upper perforated plate 4 and a lower perforated plate 5. The primary cards are arrested in sensing position within the card chamber by one or other of a pair of card stops 6 and 7, shown more clearly in Figure 2. When a card is to be located in a position such that the normal data index positions therein can be sensed, the card is arrested by the stop 6 and when a card is to be arrested in position for sensing interstage data index positions it is arrested by the stop 7. The stops 6 and 7 are movable relatively one to the other and are vertically movable through the action of a cam 8 secured to an upper drive shaft 9, the stops 6 and 7 being sprung downwards by springs 10 and 11 respectively. The card stops are guided during their vertical movement by guides 12 secured to the frame of the machine.

Extending from the rear face of the card stop 6 are two pins 13 which rest on an upper edge 14 of the card stop 7 as shown in Figure 2. The stop 7 is provided with pins 15 engaged by arms 16 secured to a rock shaft 17 supported by the side frames of the machine. The rock shaft 17 is operated by the cam 8 through a bell-crank 18, link 19, and arm 20, the latter being secured to the shaft 17. The cam 8 is rotated once during each cycle of the main shaft 45, Figures 1B and 3, of the machine so that the rear stop is moved into and out of sensing position during each cycle of the main shaft. If, however, the stop 7 is to be employed to arrest a card in position for interstage sensing, the card stop 6 must be rendered inactive and this is effected by a manually operable control lever 21, Figures 2 and 3, at the front of the machine, the lever being movable to active or inactive position. A link 22 connects the lever 21 to a further link 23, one end of which is pivoted on a stud 24 fixed to the machine frame, the other end of the link 23 having pivoted thereto one end of a further link 25, the opposite end of which is connected to an arm 26 secured to a rocking spindle 27. Also secured to the rocking spindle 27 are two control arms 28 the free ends of which are disposed beneath pins 29 extending laterally from a block 30 secured to the rear face of the card stop 6 for movement in a slot formed in the upper part of the card stop 7. When the control lever 21 is operated to render the card stop 6 inactive, the control arms 28 engage the pins 29 on the card stop 6 and retain it in raised position so that the card stop 7 is permitted to move downwards to card arresting position on the action of the cam 8, and springs 11, the springs 10 controlling the card stop 6 being extended. A spring 31 retains the control lever 21 biased in the position to which it is manually set.

After the primary card is released by the card stop 6 or 7 which has retained it in sensing position it is fed out of the card chamber by further feed rollers 32 and is delivered into a card receiver 33 which may be constructed as described in co-pending application S. N. 205,841, filed January 13, 1951.

The secondary cards are contained in a magazine 34 from the bottom of which they are fed one at a time by a reciprocating picker element 35 to feed rollers 36 which feed them into a card chamber formed by an upper perforated plate 37 and a lower perforated plate 38, the cards being arrested in sensing position between the plates 37 and 38 either by a card stop 39 or a card stop 40. The card stop 39 is provided to arrest a card in position for normal sensing and the card stop 40 is provided to arrest a card in position for interstage sensing. The card stops 39 and 40 comprise flat plates mounted in known manner on vertically reciprocable supports 41 and 42, the lower ends of the supports being movable in slots formed in a bar 43 fixed to the machine frames. The card stops are sprung downwards by springs, not shown, and the support 42 is operated by a cam 44 on the main shaft 45 of the machine, the stop 40 being movable with and relatively to the stop 39. When the stop 39 is to be employed to arrest a card in normal sensing position, it is moved together with the stop 40, but when only the stop 40 is to be operative to arrest a card in the interstage sensing position, then the stop 39 is rendered inactive by a latch 46 secured on a spindle 47 to one end of which is secured an arm 48. To the other end of the arm 48 is connected a link 49 which, in turn, is connected through links and arms 50, 51, 52, 53, 54, 55 to a control lever 56 located at the front of the machine for manual operation.

When a card is released by a card stop 39 or 40 it is fed out of the card chamber by feed rollers 57 and is delivered into a card receiver 58 similar to that described in the aforesaid copending application S. N. 205,841, filed January 13, 1951.

The primary sensing device comprises a locked pin box as described in British Specification No. 401,012, but in its present employment, the locked pin box is inverted so that the transmission pins 59, Figure 1A, associated therewith operate in a downward direction instead of an upward direction as described in the aforesaid specification. The movable part 60 of the locked pin box is reciprocable towards and away from the sensing chamber formed by the perforated plates 4 and 5 by an arm 61 pivotally mounted on a stud 62 mounted on the side frame of the machine, Figure 3. The end of the arm opposite that which is pivoted on the stud 62 is provided with a slot in which is located a sliding element 63 mounted on a stud 64 secured to the outer face of a gear wheel 65 to be eccentric with the axis thereof. The arm 61 is secured by a stud 66 to the movable part 60 in which are located the sensing pins 67 of the pin box and to give an even movement to the moving part 60, an arm similar to the arm 61 is provided on the opposite side of the machine, such other arm being arranged for operation in the manner just described, but the gear 65 being replaced by a plain disc, not shown, but mounted on the shaft supporting the gear 65. The gear 65 is rotated by a further gear 68 which is secured to the top driving shaft 9 and the driving shaft 9 is driven by a sprocket 70, a sprocket chain 72, and a second driving sprocket 73, which latter is secured to the main shaft 45 for rotation therewith. Thus, at each revolution of the main shaft 45, the sensing pins 67 are lifted upwards to sense a card located in sensing position between the perforated plates 4 and 5 and, on their downward movement, operate transmission pins 59 to transmit the sensed data pattern to transmission wires 74 contained in a connection box 75. The connection box is constructed in a manner well known in the art and the transmission wires 74 are actuated by the transmission pins 59, the transmission wires 74 in turn actuating the upper slidable elements 76 of the comparing mechanism. As will be well understood, the connection box is, in known manner, adapted to be removably supported between the transmission pins 59 and the comparing mechanism so that it can be removed and replaced by a different connection box to permit the predetermination of the comparing mechanism field to which the data sensed by the primary sensing device is to be transmitted.

The secondary sensing device comprises a fixed pin box 77 having sensing pins 78 which cooperate with transmission elements 79 located between the sensing pins 78 and the lower slidable elements 80 of the comparing mechanism. The perforated plates 37, 38 for the sensing chamber are supported by a vertically reciprocable carriage 81, reciprocation of the carriage being effected by a bellcrank 82 pivoted at 83 and controlled in known manner by a cam, not shown, on the main shaft 45. On upward movement of the carriage 80, those sensing pins 78 which do not pass through data indicating perforations in the card contained in the card chamber are raised by engagement with the card, thereby raising the corresponding transmission elements 79 and effecting actuation of the slidable elements 80 associated therewith.

As stated above, the provision of the connection box 75 determines the fields which are compared as between primary and secondary cards, but this may be still further controlled by the operation of cut-out levers 84, Figures 1A and 3, which are provided one for each column of the locked pin box as is well understood in the art. The cut-out lever 84 is connected by a link 85 to a bellcrank 86 which, in known manner, obstructs a shutter slide 87 associated with that particular column of the locked pin box, thus preventing the hatchet pins 88 for that column from being moved as a result of a sensing operation. Thus, as will be understood, when any column is cut out in this way, even though information should be sensed in that column of the card, it will not be transmitted through the connection box to the comparing unit.

The comparing unit is also provided with a cut-out mechanism for each column, the cutout mechanism for each said column being operated by a manually settable control lever 89 which prevents non-movement of the testing bar 90 to the right, as viewed in Figure 1B, affecting movement of an actuator common to the testing bars in the event of a disagreement being determined by the comparing unit in the manner described in the aforesaid application S. N. 205,702, filed January 12, 1951. According as to whether the testing bars 90 associated with the columns of the comparing mechanism in which data patterns are being compared are or are not moved lengthwise, the comparing mechanism is arranged to give a signal indicating the condition determined. The signal so given may be as described in United States patent No. 1,897,085 or in the aforesaid application S. N. 205,841, filed January 13, 1951.

When the machine is operated, the primary card is fed from the magazine 1 before the secondary card is fed from the magazine 34 and the timing of the sensing devices is such that the movable part 60 of the locked pin box is moved upwards to effect sensing of a card located between the perforated plates 4 and 5 before sensing of the secondary card is effected and the secondary card is disposed in sensing position between plates 37 and 38 at about the time the movable part 60 of the locked pin box reaches its uppermost position then, as the movable part 60 is lowered, the carriage 81 is moved upwards to effect sensing of the secondary card and accordingly the data patterns sensed by the primary and secondary sensing devices are simultaneously transmitted to the comparing mechanism through the transmission means 59, 74, and 79.

In some instances it is desired to check that one record card of a pair being compared contains perforations, for example control holes, in selected data indicating positions of the card whereas no perforations are provided in the corresponding data indicating positions of the other card of the pair. To permit this check to be made simultaneously with the comparing of the selected field or fields of the cards, the connection box 75 is constructed as illustrated in Figure 4.

The connection box 75 contains transmission wires 74 as described above but to the bottom plate 91 is secured a block 92 bored to house a plunger 93 and one end of a Bowden wire 94. The plunger 93 is disposed above a selected one of the upper slidable elements 76 of the comparing mechanism and is normally retained in an inactive position by a spring 95.

To one side 96 of the connection box is secured a second block 97, the block being bored to house the other end of the Bowden wire 94 and an operating pusher rod 98. An interponent 99 is pivoted at 100 to a bracket 101 secured to the side 96 of the connection box and engages the outer end of the rod 98.

Attached to a bracket 102 secured to the connection box is a support 103 for a bearing 104 housing an operating element 105. The operating element consists of a spindle movable axially in the bearing 104 against the action of a spring 106 and is provided with a knob 107 by which it can be manually adjusted axially. A pin 108 extending laterally from the spindle 105 is located in the horizontal portion 109 of a slot formed in the bearing 104 when the plunger 93 is inactive but when the spindle 105 has been adjusted to render the plunger 93 active the spindle is retained in its active position by locating the pin 108 in the portion 110 of the slot.

Although only one plunger 93 has been described above it will be understood that a plurality of such plungers may be provided if desired and when a plurality of plungers is employed each may be independently actuated by a spindle 105 or a selected number may be arranged for simultaneous actuation by a single spindle 105. In this latter instance the block 97 may be such as to accommodate a plurality of pusher rods 98 and Bowden wires, and the ends of each of the rods 98 are engaged by the interponent 99 so that on operation of the spindle 105 the interponent 99 simultaneously actuates each of the rods 98 in the block 97.

In order that the operation of the machine may be clearly understood, the manner in which the machine is conditioned to perform its several functions will now be briefly described and for the purpose of this description it will be assumed that the primary and secondary cards are each cards of the kind known as 65 column cards.

OPERATION I

*Comparing a normal primary field with a like normal secondary field*

Let it be assumed that in the primary and secondary cards the field to be compared is a field comprising card columns 10 to 15, no comparison being required between the remaining columns of the two cards. The connection box 75 will be one containing transmission wires 74 which will transmit sensings obtained from card columns 10 to 15 in the primary card to columns 10 to 15 in the comparing mechanism. To ensure that no comparisons are effected between data sensed from columns other than those comprising the selected field, columns 1 to 9 and 16 to 65 are cut out by operating the appropriate control levers 89 associated with the comparing mechanism. Thus, even though data be transmitted to these columns no comparison will be effected. Also, prior to starting the machine, the control levers 21 and 56 are so conditioned that the cards will be arrested in sensing position by the normal card stops 6 and 39 respectively.

OPERATION 2

*Comparing a normal primary field with a like secondary interstage field*

Let it again be assumed that the normal and interstage fields to be compared both comprise card columns 10 to 15. The connection box 75 is similar to that employed in Operation 1 and columns 1 to 9 and 16 to 65 of the comparing mechanism are cut out by the appropriate control levers 89. Before starting the machine, however, the control lever 21 is conditioned so that the primary cards are arrested by the normal card stop 6 and the control lever 56 is conditioned so that the normal card stop 39 is rendered inactive and the secondary cards are arrested by the interstage card stop 40.

OPERATION 3

*Comparing a primary interstage field with a like secondary normal field*

Let it again be assumed that the normal and interstage fields to be compared both comprise card columns 10 to 15. The machine is conditioned as described for Operation 2 except that the control lever 21 is conditioned so that the normal card stop 6 is rendered inactive and the primary cards are arrested by the interstage card stop 7, and the control lever 56 is conditioned so that the normal card stop 39 is active and acts to arrest the secondary cards in normal sensing position.

OPERATION 4

*Comparing a primary interstage field with a like secondary interstage field*

Let it again be assumed that the interstage fields to be compared both comprise card columns 10 to 15. The connection box 75 employed is as described in the preceding operations and columns 1 to 9 and 16 to 65 of the comparing mechanism are cut out by actuation of the control levers 89. Before starting the machine, the control levers 21 and 56 are both operated to render inactive the normal card stops 6 and 39 respectively so that the primary and secondary cards are respectively arrested in interstage sensing position by the interstage card stops 7 and 40.

OPERATION 5

*Comparing a normal primary field with a different normal secondary field*

Let it be assumed that a normal field comprising card columns 10 to 15 in the primary card is to be compared with a normal field comprising columns 20 to 25 in the secondary card. The machine will be conditioned as described for Operation 1, except that the connection box 75 employed will contain transmission wires 74 which will transmit a data pattern sensed in normal data positions in columns 10 to 15 of a primary card to columns 20 to 25 of the comparing mechanism. In the comparing mechanism columns 1 to 19 and 26 to 65 will be cut out by operation of the control levers 89.

OPERATION 6

*Comparing a normal primary field with a different interstage secondary field*

Let it be assumed that a normal primary field consisting of card columns 10 to 15 is to be compared with an interstage secondary field consisting of card columns 20 to 25. The connection box employed will be the same as that for Operation 5, and the comparing mechanism will be conditioned as for Operation 5, the card stops being conditioned as for Operation 2.

OPERATION 7

*Comparing a primary interstage field with a different secondary normal field*

Let it be assumed that an interstage field in the primary card consisting of card columns 10 to 15 is to be compared with a normal field on the secondary card consisting of columns 20 to 25. The connection box will be that described for Operation 5 and the comparing mechanism will be conditioned as described for Operation 5. In this instance, however, the card stops will be conditioned as described for Operation 3.

OPERATION 8

*Comparing a primary interstage field with a different secondary interstage field*

Let it be assumed that an interstage field of the primary card consisting of card columns 10 to 15 is to be compared with an interstage field on the secondary card consisting of card columns 20 to 25. The connection box 75 employed is the same as for Operation 5 and the comparing mechanism is conditioned as described for Operation 5. The card stops are conditioned as described for Operation 4.

OPERATION 9

*Comparing one field on a primary card with a plurality of fields on a secondary card*

Let it be assumed that a normal field in the primary card consisting of card columns 10 to 21 is to be compared with two normal secondary fields consisting respectively of card columns 10 to 15 and 20 to 25. The connection box 75 will contain transmission wires 74 which will, in known manner, transmit a data pattern from primary columns 10 to 15 to comparing mechanism columns 10 to 15 and will also transmit a data pattern from primary columns 16 to 21 to comparing mechanism columns 20 to 25. Columns 1 to 9, 16 to 19 and 22 to 65 of the comparing mechanism will be cut out by the operation of the appropriate control levers 89. Before starting the machine, the card stops will be conditioned, through control levers 21 and 56, so that the normal card stops 6 and 39 are actuated to arrest cards in normal sensing positions. It should be understood that this operation is only one of many which could be given to illustrate the manner in which a single field in a primary card can be compared with two or more fields in a secondary card.

OPERATION 10

*Checking that a field in a secondary card contains no data perforations*

It is sometimes required to check secondary cards to ensure that no data perforations are punched in a particular field although the same field in a primary card may contain data perforations. This operation may be effected by a machine according to the invention by so conditioning the machine that the secondary card is compared with an inactive portion of the locked pin box thereby giving the equivalent of a blank field in the primary card. Thus, if it is assumed that it is desired to check that no data perforations are contained in columns 30 to 35 of a secondary card, columns 30 to 35 of the locked pin box are rendered inactive by actuation of the cut-out levers 84 associated with these columns so that even though the sensing pins 67 for those columns may sense data indicating perforations, the data pattern so sensed is not transmitted through the connection box to the comparing mechanism. The data pattern sensed in columns 30 to 35 of the secondary card is transmitted to columns 30 to 35 of the comparing mechanism but as no setting of the upper slides 76 is effected in columns 30 to 35 thereof, there will be a disagreement recorded thus indicating that the secondary card contains in columns 30 to 35 thereof data perforations which should not be there.

OPERATION 11

*Checking that selected positions on one card contain data perforations*

When it is desired to check that the cards of one pack contain data perforations, such as control holes, in selected data positions the machine may be conditioned to function as described in any of the Operations 1 to 10 described above. The machine is, however, further conditioned by employing a connection box as described with reference to Figure 4 and before starting the comparing operations the spindle 105 is operated to actuate the plunger or plungers 93 so that these are moved to active position in which the upper slidable element or elements 76 associated therewith are given a setting. This setting is retained by locating the pin 108 in the portion 110 of the slot formed in the bearing 104 thus preventing the return of the spindle 105 before the pin is again manually restored to the portion 109 of the slot. Thus during each comparing operation the lower slidable element or elements 77 associated with the permanently set upper element or elements 76 co-operate therewith to check that data perforations are in the selected positions in the secondary cards, and this check is made simultaneously with the comparison being effected in the selected field or fields of the primary and secondary cards.

We claim:

1. For comparing statistical record cards, a machine comprising a first and a second sensing device, the sensing devices each including sensing pins for sensing data indicating perforations in record cards, said sensing devices being operable in timed relation so that one effects sensing in advance of the other, comparing mechanism to compare a data pattern sensed by the first sensing device with a data pattern sensed by the second sensing device, and to give an indication of agreement or disagreement between the data patterns compared, and transmission means for each sensing device to transmit a data pattern sensed thereby to the comparing mechanism, the transmission means for the first sensing device comprising a locked pin box and a connection box and the transmission means for the second sensing device comprising reciprocable elements located between the sensing pins of the second sensing device and the comparing mechanism, the sensing pins of the first sensing device being movable from sensing position to actuate their transmission means simultaneously with that part of the sensing movement of the sensing pins of the second sensing device during which the said reciprocable elements are actuated thereby to transmit to the comparing mechanism data patterns sensed by the sensing devices.

2. A machine according to claim 1, wherein presettable means associated with the connection box is operable to apply a permanent setting to a selected data indicating position or positions in the part of the comparing mechanism which is adapted to receive data patterns transmitted thereto by the connection box whereby a selected data indicating position or positions in a record card corresponding to the said permanently set data indicating position or positions of the comparing mechanism sensed by the second sensing device may be compared with said permanent setting or settings to determine the presence or absence of a data indicating perforation in said selected position or positions of the record card.

3. A machine according to claim 2, wherein the presettable means comprises for each selected position a normally inactive plunger and manually operable setting means to move the plunger from inactive to active position.

4. A machine according to claim 3, wherein the manually operable setting means comprises an operating element movable lengthwise against the action of a spring and arranged to operate a Bowden wire to effect movement of the plunger from inactive to active position.

5. A machine according to claim 3, wherein there is provided a plurality of plungers, one for each of a plurality of selected positions in the comparing mechanism, and a Bowden wire for each said plunger, and wherein an interponent is provided between the operating element and said Bowden wires whereby the plungers may be simultaneously moved from inactive to active position on actuation of the operating element.

6. A machine according to claim 1, wherein the connection box is removably supported with respect to the locked pin box whereby one connection box may be replaced by another to permit a selected field or fields of one record card to be compared with a selected but different field or fields of a second record card, the locked pin box and the comparing mechanism each having selectively operable control means associated therewith whereby the columns comprising the fields to be compared may be predetermined.

7. A machine according to claim 1, wherein each sensing device has card arresting means associated therewith to position a record card relative thereto to be sensed thereby, each such card arresting means being arranged to be selectively conditioned to position a record card relative to its associated sensing device for sensing either normal data positions or interstage data positions of the card.

8. A machine according to claim 7, wherein each said card arresting means comprises two reciprocable card stops arranged to be simultaneously movable to and from card arresting position and to be movable relatively one to the other, and a latch to retain one of the stops in an inactive position.

ARTHUR THOMAS.
FREDERICK SIDNEY RHODES.

References Cited in the file of this patent

UNITED STATES PATENTS

| Number | Name | Date |
|---|---|---|
| 1,897,085 | Thomas | Feb. 14, 1933 |
| 2,211,093 | Braun | Aug. 13, 1940 |